Figure 1:
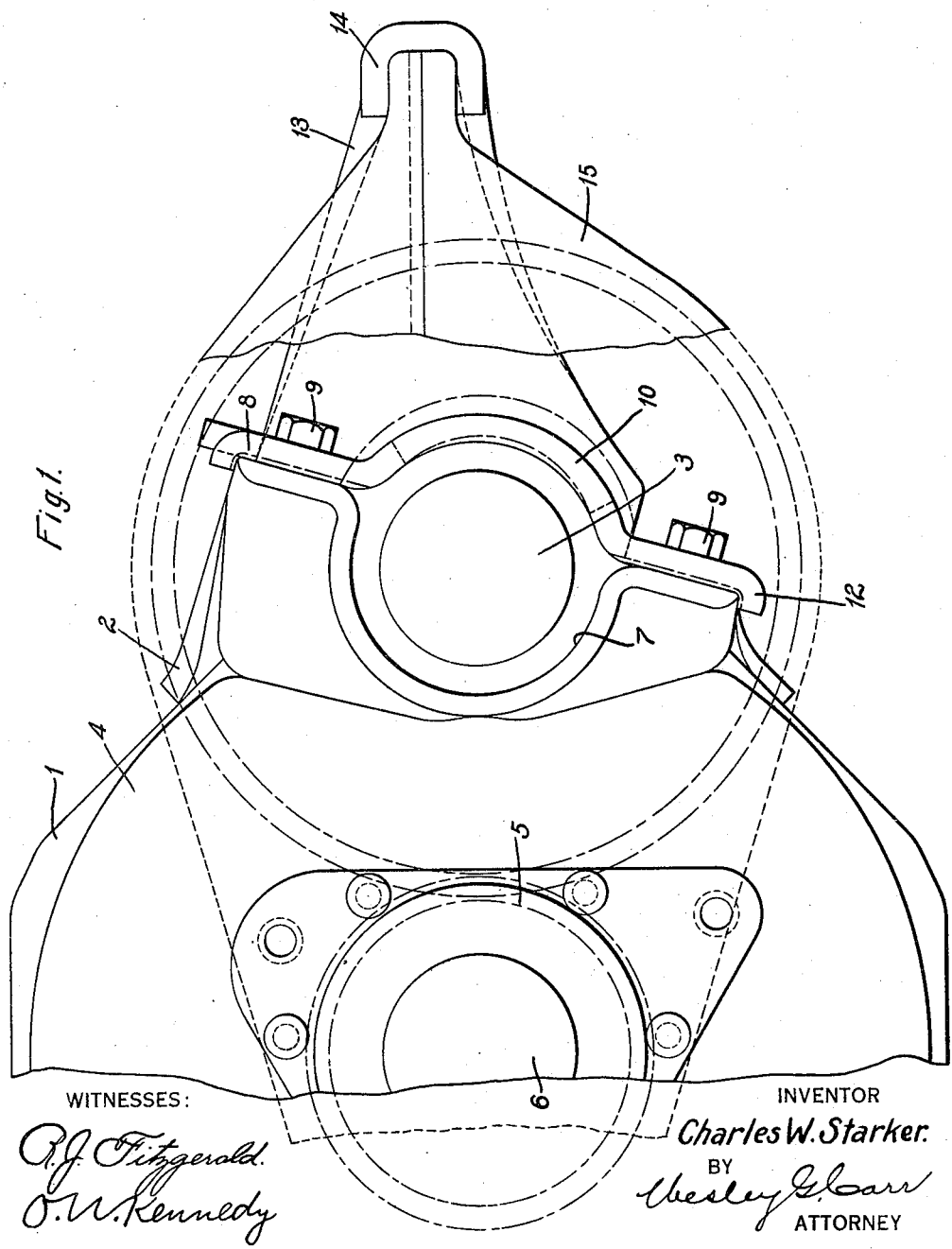

C. W. STARKER.
AXLE CAP FOR DYNAMO ELECTRIC MACHINES.
APPLICATION FILED FEB. 3, 1917.

1,300,509.

Patented Apr. 15, 1919.
2 SHEETS—SHEET 1.

WITNESSES:
O. J. Fitzgerald.
O. W. Kennedy

INVENTOR
Charles W. Starker.
BY
Wesley G. Carr
ATTORNEY

C. W. STARKER.
AXLE CAP FOR DYNAMO ELECTRIC MACHINES.
APPLICATION FILED FEB. 3, 1917.
1,300,509.
Patented Apr. 15, 1919.
2 SHEETS—SHEET 2.
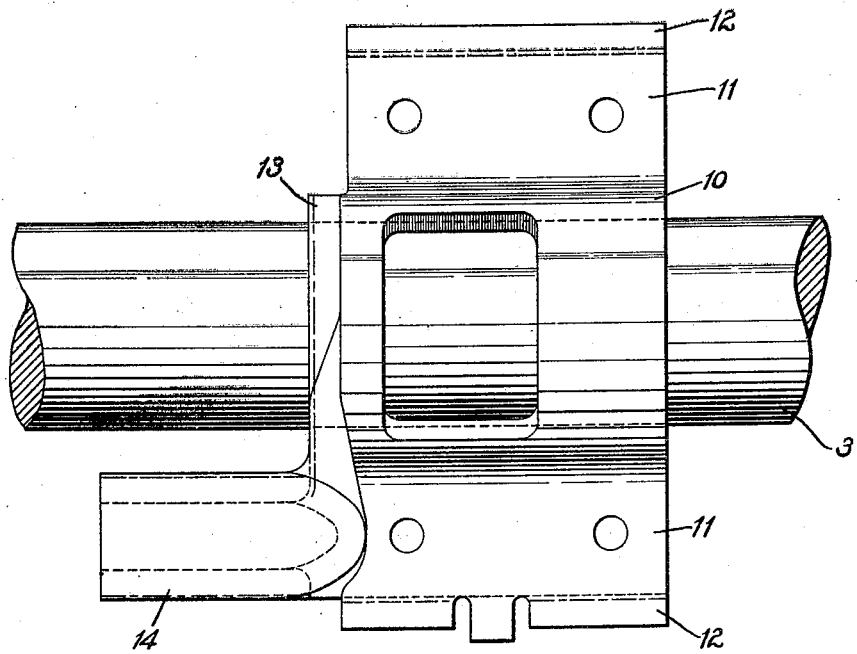
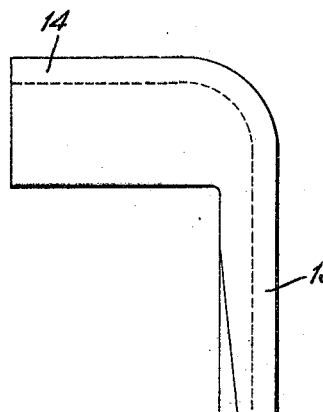
WITNESSES:
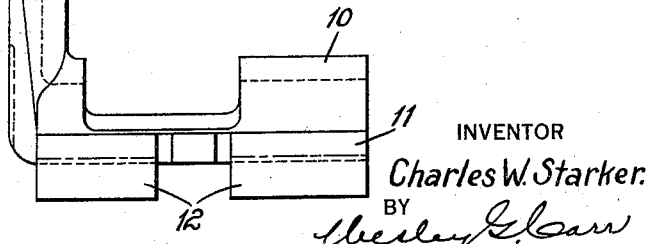
INVENTOR
Charles W. Starker.
BY
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

AXLE-CAP FOR DYNAMO-ELECTRIC MACHINES.

1,300,509.  Specification of Letters Patent.  Patented Apr. 15, 1919.

Application filed February 3, 1917. Serial No. 146,450.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Axle-Caps for Dynamo-Electric Machines, of which the following is a specification.

My invention relates to dynamo-electric machines and particularly to motors of the railway type in which the axles are closely associated with the inclosing casings of the motors, and it has for its object to provide a one-piece axle cap and gear-case support that may be conveniently and inexpensively formed from pressed metal.

In my copending application, Serial No. 258,619, filed Oct. 17, 1918, is shown and described a dynamo-electric machine embodying an axle-cap member to which is secured a relatively light-weight gear-case supporting arm and a lubricant-containing compartment, all of the parts being of pressed metal and particularly simple and inexpensive in construction. According to the present invention, I further simplify the structure of the above-described machine by providing a one-piece axle cap and gear-case supporting arm.

In the accompanying drawing, Figure 1 is a view, in end elevation, of a portion of a dynamo-electric machine provided with an axle cap constructed in accordance with my invention, and Figs. 2 and 3 are views, in plan and in side elevation, respectively, showing the axle cap.

Referring to Fig. 1, the dynamo-electric machine comprises an inclosing casing 1 to which is secured an axle bracket 2 for partially inclosing an axle 3. The casing 1 is provided with an end member 4 within which is located a bearing 5 for rotatably supporting the armature shaft 6 of the machine. The armature shaft 6 and the axle 3 are operatively connected by suitable gearing, shown in dotted lines. The axle bracket 2 comprises a semi-cylindrical seat 7 within which is located the axle 3, and an axle cap 8 is secured thereto by means of bolts 9.

As best shown in Figs. 2 and 3, the axle cap 8 comprises a curved axle-inclosing portion 10 and straight side portions 11 that terminate in flanges 12 which embrace the sides of the axle bracket 2. The curved portion 10 and one side portion 11 are bent at one end to form an upwardly extending portion 13, the sides of which converge and are folded over at the top to form an arm 14. The arm 14 extends in the direction of the axle 3 and is in substantially parallel relation to the portions of the shaft 6 and the axle 3 that project beyond the end of the member 4. The arm 14 is of substantially U-shape in cross section and is adapted to receive one end of a gear-case member 15 that incloses the driving gears between the shaft 6 and the axle 3.

In the above-mentioned copending application, is disclosed and claimed an arrangement whereby the axle bracket 2 may be adjusted with respect to the casing 1 in order to readily effect variations in the distance between the central axis of the shaft 6 and of the axle 3, respectively. This arrangement permits the use of different gear ratios in the transmission of power between the motor shaft and axle. While it is understood that this arrangement forms no part of the present invention, it should be noted that, by varying the length and position of the upwardly extending portion 13, the position of the arm 14, relative to the casing 1, may be varied to properly support the gear-case 15 with different distances between the center lines of the meshing gear and pinion, as described above. It will be readily understood that such variations in the form of axle cap may be made with a single set of tools, thereby facilitating the production of axle caps for use in connection with motors employing a relatively wide range of gear ratios.

From the foregoing, it is apparent that my combined axle cap and gear-case supporting arm may be readily formed from a single piece of metal and with a considerable reduction in weight and cost and with an increased adaptability, as compared with similar members formed of cast metal.

While I have shown my invention in a simple and preferred form, it is not so limited but is susceptible of various changes within the scope of the appended claims.

I claim as my invention:

1. An axle cap comprising a curved axle-engaging portion, the said curved portion having one end bent perpendicularly and laterally to the axle to form a gear-case supporting arm.

2. An axle cap comprising a curved axle-engaging portion and straight side portions, the said curved portion and one of said straight portions having one end bent perpendicularly and laterally to the axle to form an arm having a portion extending substantially parallel to said axle-engaging portion.

3. An axle cap comprising a curved axle-engaging portion and straight side portions, the said curved portion and one of said straight portions being bent at one end to form a portion having convergent sides and extending perpendicularly to the axle, said perpendicular portion being bent to form an arm extending substantially parallel to the axle.

4. A cap for an axle comprising a curved axle-engaging portion and straight side portions, the said curved portion and one of said straight portions being bent at one end to form a portion having convergent sides and extending perpendicularly to the axle, said perpendicular portion being bent parallel to the axle and folded over to form an arm that is substantially U-shaped in cross-section.

5. An axle cap comprising a curved axle-engaging portion and straight side portions, the said curved portion and one of said straight side portions being bent at one end to form a portion having convergent sides and extending perpendicularly to the axle, said perpendicular portion being bent and folded over to form an arm extending substantially parallel to said axle-engaging portion.

6. The combination with a motor casing and an axle-bracket adapted to support a part of the motor casing on an axle and having a seat extending partially around said axle, of an axle cap having a seat extending around the remainder of said axle and provided with a straight portion joined to said bracket, the plane of the engaging surfaces of the bracket and said cap being inclined to vertical and horizontal lines extending through the axle, said cap further having a portion bent perpendicularly and in parallel relation to the axle to form a gear-case supporting arm.

In testimony whereof, I have hereunto subscribed my name this 29th day of January, 1917.

CHARLES W. STARKER.

Copies of this patent may be obtained for five cents each, by addressing the "Commissioner of Patents, Washington, D. C."